April 10, 1928.  1,665,294
R. BERINGER
CONVERTIBLE BODY
Filed Dec. 1, 1924   2 Sheets-Sheet 1
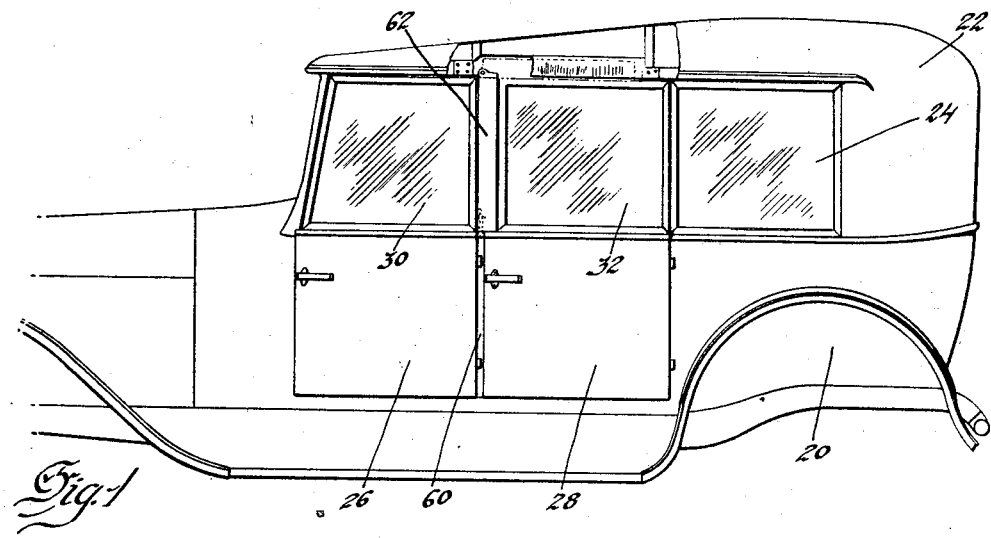
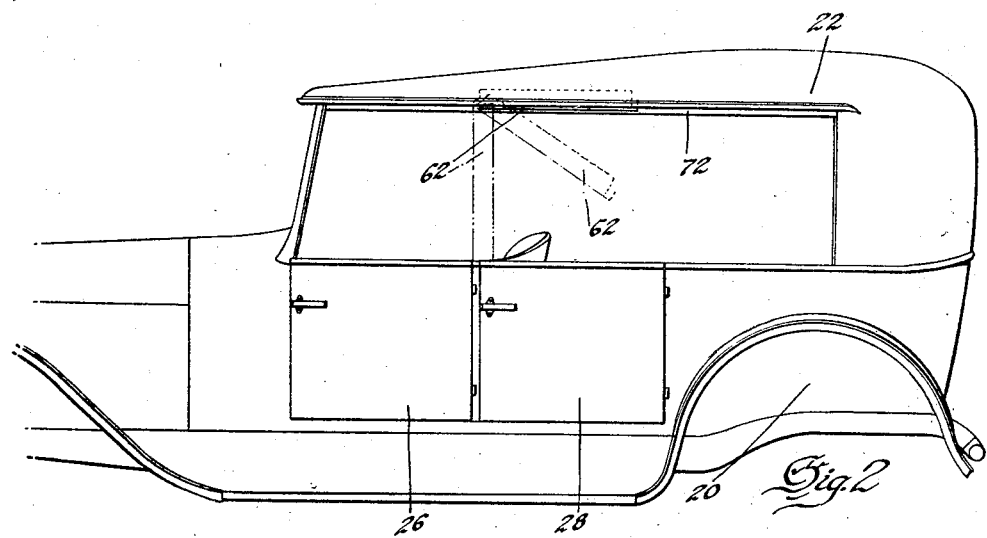
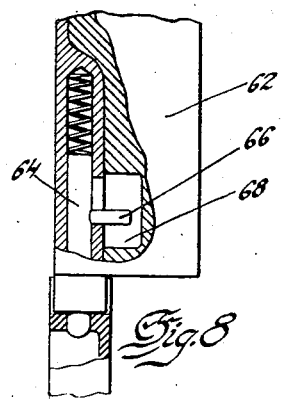
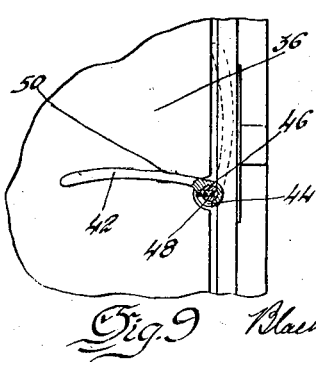
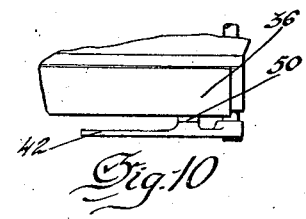
INVENTOR
Roscoe Beringer
BY
Blackmore, Spencer & Flint
ATTORNEY April 10, 1928.
R. BERINGER
1,665,294
CONVERTIBLE BODY
Filed Dec. 1, 1924
2 Sheets-Sheet 2
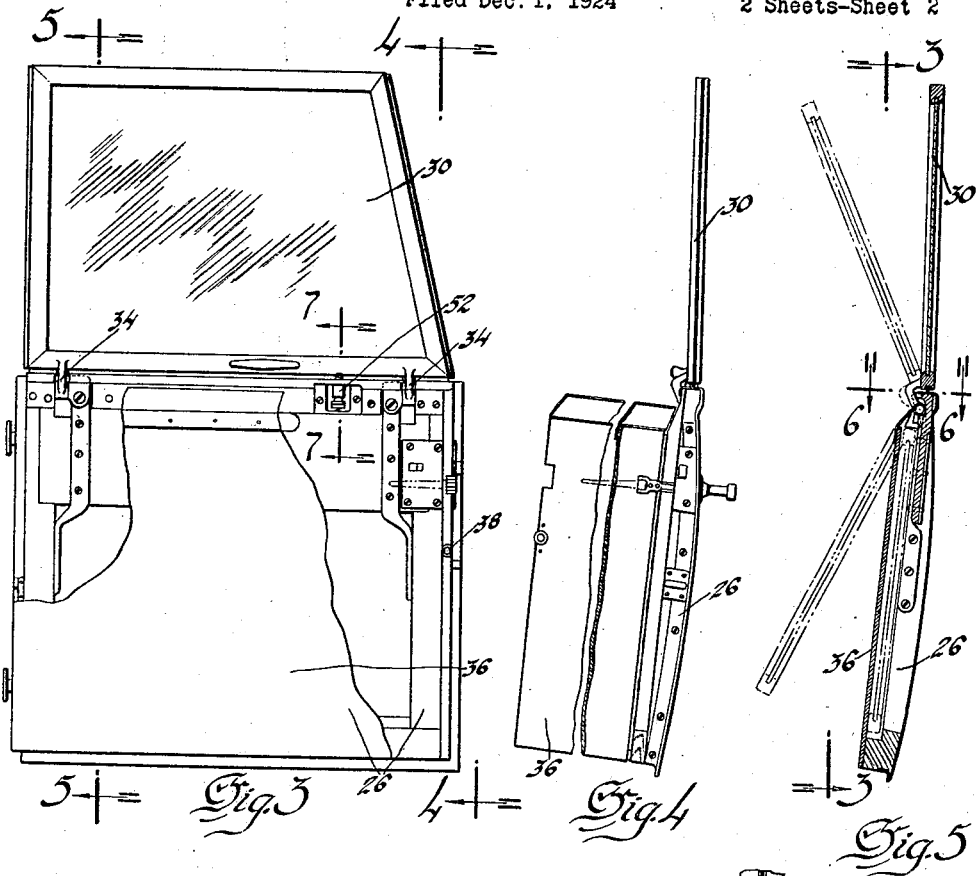
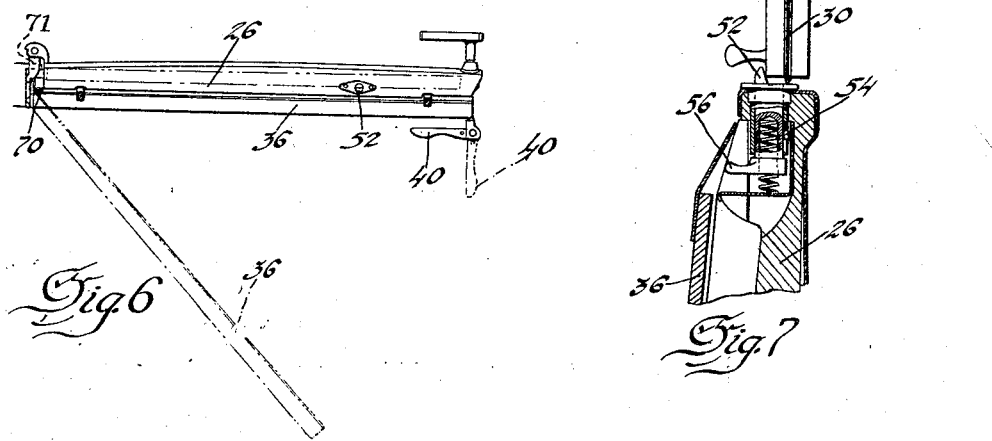
INVENTOR
Roscoe Beringer
BY
ATTORNEY Patented Apr. 10, 1928.

1,665,294

UNITED STATES PATENT OFFICE.

ROSCOE BERINGER, OF DETROIT, MICHIGAN, ASSIGNOR TO GENERAL MOTORS CORPORATION, OF DETROIT, MICHIGAN, A CORPORATION OF DELAWARE.

CONVERTIBLE BODY.

Application filed December 1, 1924. Serial No. 753,248.

This invention relates to convertible automobile bodies of the type in which the space below the automobile top may be closed, when desired, by removable glass panels. An object of the invention is to provide an improved arrangement of this character in which the panels for the space above the doors, when not in use, are housed within the doors. Various features of the invention relate to a construction of the door permitting the use of a panel having one edge in vertical alinement with an edge of the door; to a novel arrangement of the operating handle for the locking of the door permitting it to be moved to a position in which it does not obstruct the movement of the panel from its position within the door, and preferably an arrangement in which this handle normally holds the covering for the panel in closed position; and to a novel arrangement including a spring pressed latch holding the panel when in its upper position.

These features of the invention, and various novel desirable details of construction, will be apparent from the following description of one illustrative embodiment shown in the accompanying drawings, in which:

Figure 1 is a side elevation of an automobile body, with the panels in their upper or closed position, and partly broken away to show a novel removable pillar for the space between the two doors;

Figure 2 is a similar side elevation when the body is open;

Figure 3 is an inside elevation of one of the doors with the panel in its upper position and partly broken away to show some of the interior mechanism;

Figure 4 is an end elevation of the door looking in the direction of the arrows 4—4 of Figure 3, but with the cover for the panel partly open;

Figure 5 is a section on the line 5—5 of Figure 3 showing the movement of the panel from upper to lower position;

Figure 6 is a top plan view of the door when the panel is housed within the door;

Figure 7 is a vertical sectional view on the line 7—7 of Figure 3 showing the spring pressed latch holding the panel in its upper position;

Figure 8 is a detailed view showing a spring pressed bolt holding the removable pillar between the two doors;

Figure 9 is an inside elevation of a modified form of handle for the lock of the door; and Figure 10 is a top plan view of the handle shown in Figure 9.

In the arrangement selected for illustration, the invention is embodied in an automobile body 20 and a top 22, shown as a permanent top. The space between the top and the body rearwardly of the doors may be closed, when desired, by a panel 24 of any desired construction. Each of the doors 26 and 28, on the same side of the body, has hinged at its upper edge one of the two panels 30 and 32. The hinges 34, carrying the panel, are shown in Figure 3. Each panel consists of a sheet of glass, and a metal frame generally H-shaped in cross-section, to form an inner channel embracing the edge of the glass and an outer channel embracing projecting rubber weather or sealing strips. The panel may be moved from an upper position in which it closes the space between the top and the door, as shown in Figure 5, to a position in which it is housed in a recess within the door, the recess being protected by a cover 36 hinged at one side of the door. In the arrangement shown in Figure 3 a turn-button 38 is provided to hold the cover closed. In this arrangement the inside operating handle 40 for the lock of the door is pivoted so that it can be moved into the dotted line position in Figure 6 where it does not obstruct the opening of the cover, or the lifting of the panel. Another desirable construction is shown in Figures 9 and 10 in which the inner handle 42 of the lock for the door is provided with an arcuate notch 44 in its hub, the notch extending through approximately 90° so that its upper edge engages a set screw or the like 46 projecting from the operating shaft 48 of the lock so that pushing down on the handle operates the lock. At the same time the length of the notch 44 is such that the handle can be moved into the dotted-line position in Figure 9, where it does not obstruct movement of the cover or the panel, without affecting the lock. The handle 42 is made with a retaining projection or flange 50 which engages the cover 36 when the handle is in its operative position to hold the cover closed. In this arrangement no other fastening means for the cover is required.

In its upper position the panel 30 or 32 is held by a spring latch member 52 yieldingly urged upward into operative position by a spring 54 and arranged to be depressed to release the panel by a finger piece 56 accessible through an opening in the top of the cover 36.

In the particular arrangement illustrated, the doors 26 and 28 are both hinged at their rear edges, the door 28 closing against a door post 60. In line with the door post 60 is a pillar 62 pivoted in a socket in the edge of the top so that it may be moved into the full line position shown in Figure 1, or may be swung upwardly to be housed in the recess in the top. As shown in Figure 8, the pillar is held in either position by a spring pressed latch 64 operated by a finger piece 66 projecting into an opening 68 where it is accessible to the driver.

In order to permit the panel 32 at its rear edge to be in vertical alinement with the rear edge of the door 28, as viewed from the outside of the car, the door is provided with an extension or offset 70, as shown in Figure 6, into which the storage space for the panel extends. This offset is concealed by an extension of the adjacent body panel or pillar as indicated at 71.

When the panels are in their upper positions, I consider it desirable that they should be inclined slightly so that the upper edge of each panel will engage a horizontal ledge or flange 72 projecting downwardly from the top, just before the door is completely closed. This arrangement provides for holding the panel under some tension when the door is closed to prevent it from rattling.

While one illustrative embodiment of the invention has been described in detail, it is not my intention to limit its scope to that particular embodiment, or otherwise than by the terms of the appended claims.

I claim:

1. A vehicle door having a panel hinged to its upper edge, a cover for the panel in its lower position, a latch for the door, and an operating handle for the latch arranged to hold the cover closed when in its operative position and movable to a position permitting opening of the cover.

2. An automobile door having a pocket therein and provided with a panel adapted for positioning above the door or for disposition in said pocket, a cover for said pocket, a latch for said door, and a latch operating lever adapted in normal position to hold the cover in pocket closing position.

3. The combination of a vehicle body, a door hinged to the body, a pocket formed on the inside of said door, a panel hinged to said door and adapted to be swung up to a position above said door, or downwardly to a position within said pocket, the walls of said pocket extending beyond the outside meeting edges of the body and door at the hinged side of the door so that when the panel is swung upwardly one edge of the panel will be in alinement with the said meeting edges of the body and door.

4. The combination of an automobile body, a door hinged to the body, a pocket formed on the inside of the door, the door having an extension on its inside past the outside meeting edges of the body and door at the hinged side of the door, the pocket extending into said extension.

In testimony whereof I affix my signature.

ROSCOE BERINGER.